United States Patent [19]

Yamamoto et al.

[11] Patent Number: 5,038,154

[45] Date of Patent: Aug. 6, 1991

[54] DRIVING APPARATUS FOR THERMAL HEAD

[75] Inventors: Yukio Yamamoto; Takashi Yoshida; Mitsugu Asano, all of Ibaraki, Japan

[73] Assignees: Hitachi, Ltd.; Hitachi Koki Co., Ltd., both of Tokyo, Japan

[21] Appl. No.: 367,253

[22] Filed: Jun. 16, 1989

[30] Foreign Application Priority Data

Jun. 28, 1988 [JP] Japan ............................... 63-158158

[51] Int. Cl.[5] ............................................ G01D 15/10

[52] U.S. Cl. ............................................ 346/76 PH

[58] Field of Search .................................... 346/76 PH

[56] References Cited

U.S. PATENT DOCUMENTS 4,563,691 1/1986 Noguchi et al. ............... 346/76 PH 4,590,487 5/1986 Noguchi et al. ............... 346/76 PH

FOREIGN PATENT DOCUMENTS 60-161163 8/1985 Japan .................................. 400/120

*Primary Examiner*—Benjamin R. Fuller

*Assistant Examiner*—Gerald E. Preston

*Attorney, Agent, or Firm*—Antonelli, Terry, Stout & Kraus

[57] ABSTRACT

An apparatus for driving a thermal recording head having a plurality of heat-generating elements in alignment wherein energy applied to any one heat-generating element is determined on the basis of a recording energy $E_p$ determined on an assumption that both the heat-generating element and adjacent heat-generating elements are energized and also in accordance with a compensation energy $E_r$ for compensating for an energy shortage at the time of non-energization of adjacent elements in actual recording. The recording energy $E_p$ is determined from a target energy EO required for forming a recording dot, heat storage energy $E_s$ already possessed by the element before a current energization thereof and a correction quantity given by a function of the heat substrate temperature $T_h$, and $E_s$ is stored and updated for each line recording operation in accordance with a function of $E_p$. The compensation energy $E_r$ is given by a function of the value $T_h$ selected in accordance with the energization/non-energization of the current element and adjacent elements. The amount of energy applied to each heat-generating element is finely and precisely controlled by energization pattern data D1 to D8 of n (e.g., 8) bits for selecting different combinations of durations and positions of energization pulses. There are 4096 heat-generating elements are divided into 16 blocks, and such an energization pattern data serially transferred is rearranged and transferred in parallel to the blocks.

6 Claims, 13 Drawing Sheets

DRIVING APPARATUS FOR THERMAL HEAD

BACKGROUND OF THE INVENTION

The present invention relates to a driving apparatus for a thermal head, or more in particular to a thermal head driving apparatus having a heat storage compensation circuit suitable for a high-speed, high-quality thermal recording.

The thermal head used for thermal recording comprises a plurality of heat-generating elements in alignment. Only the required ones of the heat-generating elements are heated in correspondence with image data to generate a color on thermal recording paper, and ink on an ink film is transferred onto the recording paper for recording.

In a recording operation using such a thermal head, an increase in recording speed causes the printing of the next line before sufficient diffusion and discharge of thermal energy applied to the heat-generating elements, and thermal energy is thus stored steadily in the heat-generating elements. As a result, it is conventionally experienced that each heat-generating element stores therein thermal energy corresponding to the heat generation history thereof, thereby leading to variations in energy state to cause a deteriorated image quality.

In the transfer of ink from an ink film to the recording paper, for example, a method of applying the same thermal energy to each heat-generating element without giving due consideration to the heat-generation history thereof would accumulatively add the heat storage energy and the resulting total energy would lead to an increased amount of transferred ink, thereby blurring the printed characters or making it impossible to secure the desired area gradation by tone production method by density of each element.

In order to obviate the deterioration in image quality, a heat storage compensation method has been already proposed in which a proper quantity of energy is computed for application to an objective heat-generating element from the current recording performance of the objective heat-generating element and the recording history of adjacent heat-generating elements. The method, however, requires storing of the recording history of each heat-generating element and requires, for accurate compensation, referring to a wide range of recording data, accordingly requiring a great capacity of memory.

Several attempts have been hitherto made to develop a method of more accurate heat storage compensation free of a large capacity memory which is a disadvantage of the above-mentioned method.

The disclosure of JP-A-60-161163, for example, shows a heat storage compensation system for calculating the heat storage condition of each heat-generating element for the next occasion of recording from a current heat storage condition of each heat-generating element and an energy currently applied thereto, and compensating the energy applied to the respective heat-generating element on the next occasion on the basis of the calculated storage condition.

In the above heat storage compensation system, the difference between a target energy and the energy condition of each heat-generating element stored in an energy-condition buffer is used as an energy to be applied to the particular heat-generating element. Further, an applied energy computation circuit compensates for the effect of mutual thermal reaction between any objective or current heat-generating element and peripheral heat-generating elements thereby to determine the optimum applied energy.

Further the value representing the energy to be applied to each heat-generating element determined by the applied energy computation circuit is added to a value representing the energy condition of the respective heat-generating element after one-line recording cycle calculated by a thermal diffusion computation circuit, and the addition is stored in an energy condition buffer as an energy condition of the respective heat-generating element for the next-line recording. The thermal diffusion computation circuit computes the thermal diffusion from the current energy conditions of each heat-generating element and peripheral heat-generating elements and from the temperature of the thermal head substrate and thus determines the energy condition after one-line recording cycle.

The computation process at the thermal diffusion computation circuit of such a conventional heat storage compensation system is so complex that it is difficult to meet the requirements of high recording speed and high definition.

In the case of recording an original B4 in size at the rate of 400 DPI (dots/inch) and 2 msec per line, for instance, a total of 4096 heat-generating elements is required and it is necessary to compute the thermal diffusion of each heat-generating element within 500.

This problem might be solved by use of a high-speed device or high-speed technique such as parallel processing or pipeline processing. The resulting increase in size and cost, however, makes the apparatus less practicable.

SUMMARY OF THE INVENTION

The present invention has been developed in order to solve the problems of the above-mentioned conventional apparatuses and is to provide a driving apparatus for a thermal head which produces an accurate heat storage compensation effect with a simple circuit thereby to produce a high-quality recording image at low cost even during a high-speed, high-definition recording.

In order to achieve the above-mentioned object, there is typically provided according to the present invention a thermal head driving apparatus for determining and controlling energy applied to each of a plurality of heat-generating elements of a thermal head in accordance with recording data, the apparatus comprising a buffer memory for storing recording data applied thereto, temperature detection means for detecting a substrate temperature of the thermal head, a heat storage memory for storing data of a heat storage condition of a plurality of the heat-generating elements for each one-line recording cycle, an applied energy computation circuit for determining a recording energy and a compensation energy applied to each heat-generating element on the basis of recording data outputted from the buffer memory, temperature data outputted from the substrate temperature detection means and heat storage data outputted from the heat storage memory, a heat storage computation circuit for computing a heat storage data for each heat-generating element for the next-line recording on the basis of the heat storage data of each heat-generating element outputted from the heat storage memory and the recording energy outputted from the applied energy computation circuit and for applying the computed heat storage data to the heat storage memory thereby to update sequentially the heat storage data of the heat storage memory, and an energy control circuit for controlling energy applied to each heat-generating element of the thermal head in accordance with the recording energy and the compensation energy computed by the applied energy computation circuit.

According to one aspect of the present invention, the above-mentioned object of the present invention is achieved by applying to a current heat-generating element the compensation energy determined in accordance with the temperature variations of the substrate of the thermal head and the recording (history) data of peripheral heat-generating elements in addition to a necessary energy for recording by the heat-generating eelement under a hypothetical condition that the peripheral heat-generating elements of the current heat-generating element were energized.

The compensation energy is determined on the basis of the recording data of peripheral heat-generating elements and the substrate temperature of the thermal head in such a manner as to maintain a constant heat storage for the recording energy regardless of variations in the above-mentioned factors. As a result, the heat storage computation can be effected accurately only with the recording energy and heat storage amount of each heat-generating element, thereby eliminating a complex heat storage computation.

DESCRIPTION OF THE PREFERRED EMBODIMENTS

Figure 1:
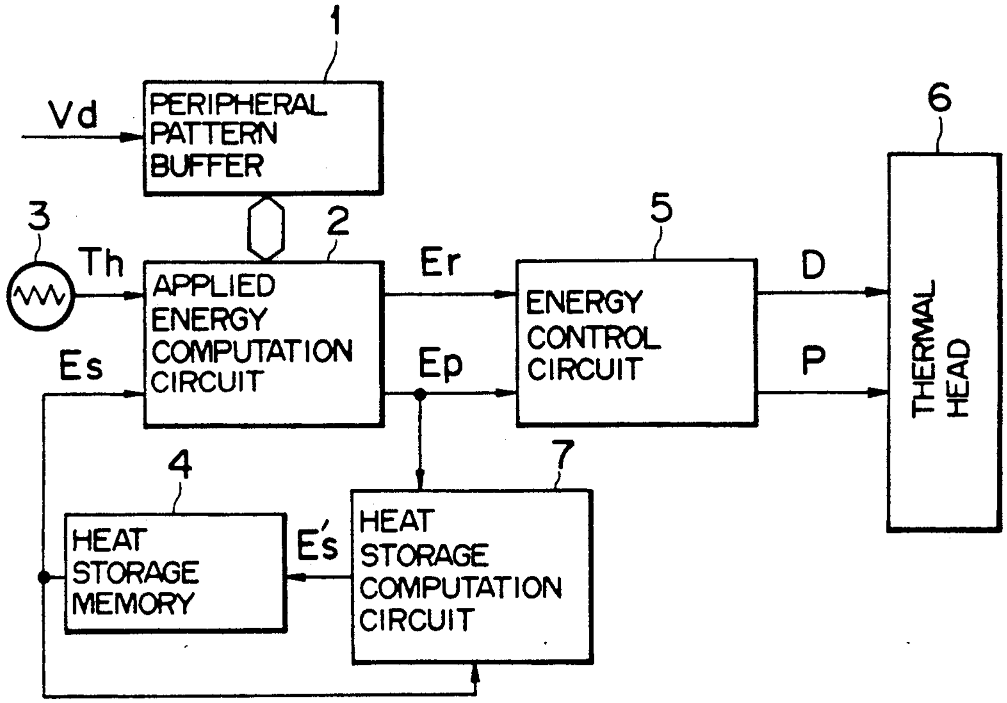
FIG. 1 is a block diagram showing a thermal head driving apparatus according to an embodiment of the present invention.
Figure 2:
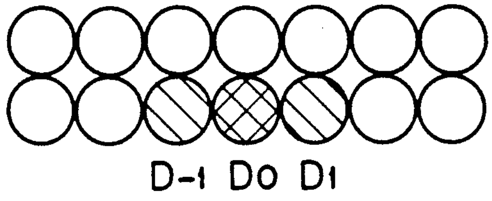
FIG. 2 is a diagram for explaining an arrangement of recording picture elements.

A block diagram of a thermal head driving apparatus according to an embodiment of the present invention is shown in FIG. 1, and a diagram for explaining an arrangement of recording picture cells is shown in FIG. 2.

In FIG. 1, reference numeral 1 designates a peripheral pattern buffer associated with a buffer memory for storing a digital recording data $V_d$ applied thereto, numeral 2 an applied energy computation circuit described in detail later, numeral 3 a thermistor associated with temperature detection means for detecting the substrate temperature of the thermal head, numeral 4 a heat storage memory for storing the condition (amount) of heat storage of each heat-generating element at each predetermined time point in a one-line recording cycle, numeral 5 an energy control circuit for controlling the electric power added to each heat-generating element of the thermal head 6 in accordance with the recording energy $E_p$ and the compensation energy $E_r$ computed by the applied energy computation circuit 2, and numeral 7 a heat storage computation circuit described in detail later.

As shown in FIG. 1, the recording image data $V_d$ corresponding to each heat-generating element is applied serially to the peripheral pattern buffer 1 for each line.

The applied energy computation circuit 2 is supplied sequentially in synchronism with the transfer of the recording image data $V_d$ with the recording data $V_d$ of the peripheral heat-generating elements and the heat-generating elements produced from the peripheral pattern buffer 1, the substrate temperature $T_h$ of the thermal head measured by the thermistor 3 arranged on the substrate of the thermal head, and the heat storage data $E_s$ indicating the heat storage amount of any objective or current heat-generating element stored in the heat storage memory 4 and read out for the heat-generating element to be computed (which heat storage data is updated and stored for each one-line recording as explained later) and produces an optimum recording energy $E_p$ and a compensation energy $E_r$.

The recording energy $E_p$ and the compensation energy $E_r$ produced sequentially from the applied energy computation circuit 2 are applied to the energy control circuit 5 and converted into an energization pattern data D, which is combined with the energization pulse P to control the applied energy E of each heat-generating element of the thermal head 6.

Further, the recording energy $E_p$ and the heat storage data $E_s$ of a corresponding heat-generating element are applied sequentially to the heat storage computation circuit 7 in synchronism, so that the heat storage data $E_s'$ of the particular heat-generating element for the next-line recording is computed and outputted. These data are sequentially recorded in the heat storage memory 4 and used for computation of the applied energy at the time of next-line recording.

In this configuration, the optimum applied energy is determined by the applied energy computation circuit 2 on the basis of the heat storage data calculated at the heat storage computation circuit 7 for each heat-generating element, and the value thus obtained is used to control the applied energy E at the energy control circuit 5, thereby assuring a high-image quality recording under any heat storage condition. Explanation will be specifically provided below.

The peripheral pattern buffer 1 is comprised of a serial-input parallel-output shift register of several bits for holding and producing several continuous pixels of the recording image data $V_d$ applied serially thereto. The data held and produced at the peripheral pattern buffer 1 makes up a recording data $V_d$ of the current objective heat-generating element and the peripheral heat-generating elements thereof for which the applied energy is to be determined, and the number of bits for this data is determined from the number of the peripheral heat-generating elements of which mutual reaction is to be taken into consideration.

An arrangement of pixels is shown in FIG. 2. According to the present embodiment, the cross-hatched recording data $D_0$ of a current objective heat-generating element and the recording data $D_{31\,1}$ and $D_1$ of adjacent heat-generating elements are assumed to have an effect on the applied energy in the explanation that follows.

The applied energy computation circuit 2 is supplied with the recording data $D_{-1}$, $D_0$ and $D_1$ from the peripheral pattern buffer 1, the substrate temperature $T_h$ of the thermal head detected by a thermistor 3 arranged on the thermal head substrate and the present heat storage data $E_s$ of a current heat-generating element stored in the heat storage memory 4. These data are read out and sequentially applied to the circuit 2 in synchronism with the transfer of the recording image data $V_d$ thereby to determine the optimum applied energy E.

The applied energy E is divided into the recording energy $E_p$ used for recording (changing depending on the recording conditions as mentioned below) and the compensation energy for maintaining a constant relationship (with a fixed energy $E_r$ for recording pixel dots) between the recording energy $E_p$ and the variation in heat storage condition, which are sequentially outputted.

Now, the manner in which the applied energy is determined will be explained in detail.

The recording energy is determined always on the assumption that the recording data $D_{-1}$, $D_1$ of adjacent heat-generating elements are unity, that is, the recording energy is applied to the adjacent heat-generating elements. The recording energy $E_p$ is thus determined by the computation shown below from the substrate temperature $T_h$ of the thermal head and the heat storage data $E_s$.

When $D_0$ is "0", $E_p=0$, and $$\text{When } D_0=\text{"1"},\ E_p=E_0-E_s-E_t(T_h) \quad (1)$$

Where $E_0$ is a target energy required for recording a predetermined size of dot on the assumption that $D_{-1}=D_1=1$, and $E_t$, which is the function of the substrate temperature $T_h$, is for compensating for the change in the target energy generated by the change in the substrate temperature $T_h$ of the thermal head.

As a matter of fact, the recording data $D_{-1}$, $D_1$ of the adjacent heat-generating elements are every always "1", so that the heat radiation and cooling amount of a particular heat-generating element during an energization period thereof are increased for an increased energy required for obtaining a predetermined dot. Also during the cooling period, there develops a difference in the amount of heat radiation or cooling amount.

The change in the heat radiation and cooling amounts of a particular (current objective) heat-generating element caused by the change in the recording data $D_{-1}$, $D_1$ of adjacent heat-generating elements is compensated for by the compensation energy $E_r$ thereby to keep constant the energy contributing to the dot recording.

The value of the compensation energy $E_r$ is determined by the values of the recording data $D_{-1}$, $D_0$ and $D_1$ and the substrate temperature of the thermal head in the manner shown in Table 1 below.

TABLE 1

| Recording data | | | $E_r$ | |
|---|---|---|---|---|
| $D_{-1}$ | $D_0$ | $D_1$ | Eenergization period | Cooling period |
| 0 | 0 | 0 | $E_1(T_h)+E_1(T_h)$ | $E_3(T_h)+E_3(T_h)$ |
| 1 | 0 | 0 | $E_1(T_h)$ | $E_3(T_h)$ |
| 0 | 0 | 1 | $E_1(T_h)$ | $E_3(T_h)$ |
| 1 | 0 | 1 | 0 | 0 |
| 0 | 1 | 0 | $E_2(T_h)+E_2(T_h)$ | $E_4(T_h)+E_4(T_h)$ |
| 1 | 1 | 0 | $E_2(T_h)$ | $E_4(T_h)$ |
| 0 | 1 | 1 | $E_2(T_h)$ | $E_4(T_h)$ |
| 1 | 1 | 1 | 0 | 0 |

As will be seen from above, the compensation energy $E_r$ is determined separately for the energization period and the cooling period.

In the table shown above, $E_1$ and $E_3$ designate the amount of energy directly flowing into a particular heat-generating element from adjacent heat-generating elements when $D_0$="0" and $D_{-1}$="1" or when $D_1$="1" during the energization period or cooling period.

$E_2$ and $E_4$, on the other hand, designate the amount of energy flowing out of a particular heat-generating element into adjacent heat-generating elements when $D_0$="1" and $D_{-1}$="0" or when $D_1$="0". The heat storage amount has only a small effect on these energy values, which considerably depend on the substrate temperature $T_h$ of the thermal head, and therefore all these values are a function of $T_h$.

In this way, the recording energy $E_p$ is determined regardless of the recording data of adjacent heat-generating elements by applying the compensation energy $E_r$. Since the energy change of the particular heat-generating element is dependent on the value $E_p$ of the recording energy, on the other hand, only the recording energy $E_p$ is used for computation of the heat storage data of the particular heat-generating element.

Figure 3:
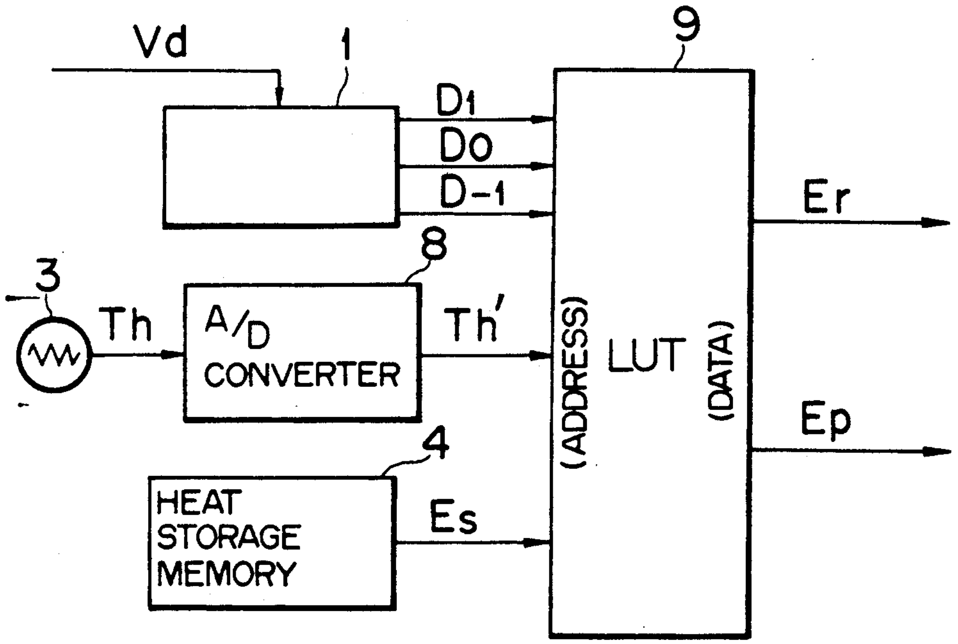
FIG. 3 is a block diagram showing an example of configuration of an applied energy computation circuit.
Figure 4:
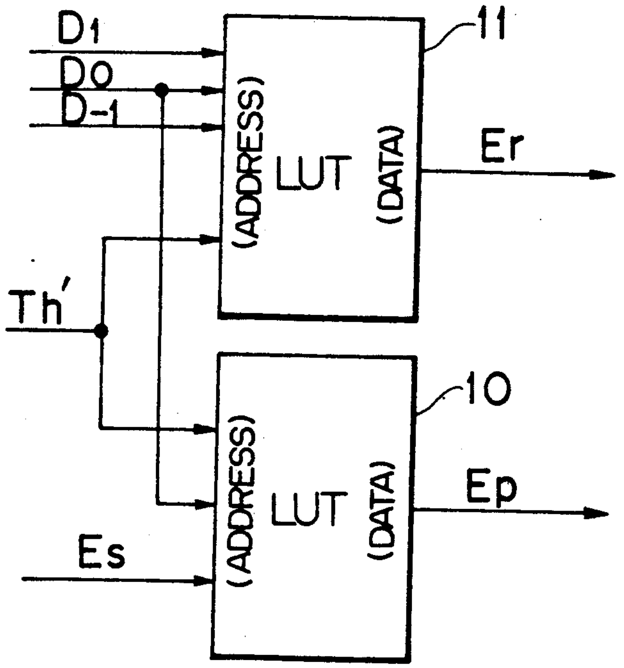
FIG. 4 is a block diagram showing another example of configuration of the applied energy computation circuit.

FIG. 3 is a block diagram showing an example of configuration of the applied energy computation circuit, and FIG. 4 is a block diagram showing another example of configuration of the applied energy computation circuit.

As shown in FIG. 3, the recording data $D_0$, $D_{-1}$ and $D_1$ of a particular heat-generating element and adjacent heat-generating elements, the digital data $T_h'$ on the substrate temperature of the thermal head obtained by converting the output $T_h$ of the thermistor 3 with an A/D converter 8, and the heat storage data $E_s$ read out of the heat storage memory 4 are applied sequentially as an address to an applied energy determination look-up table (LUT) 9.

In accordance with the above-mentioned method of energy determination, the applied energy determination LUT 9 has stored therein the recording energy $E_p$ and the compensation energy $E_r$ calculated in advance with respect to an input value, and is adapted to produce values corresponding to address input values sequentially.

Also, as shown in FIG. 4, it is also possible to determine the recording energy $E_p$ and the compensation energy $E_r$ with separate LUTs. In such a case, the recording data $D_{-1}$, $D_1$ of adjacent heat-generating elements are not required for the address input of the recording energy determination LUT 10, while no heat storage data $E_s$ is required for the compensation energy determination LUT 11, thereby saving the required storage capacity of the LUTs.

The energy applied to each heat-generating element of the thermal head is controlled by changing the normal energization time and/or the applied voltage. According to the present embodiment, the applied energy, the heat storage data, etc., will be handled as time data for explanation on the assumption that the energy control is effected by the energization time.

The resistance values of the heat-generating elements of the thermal head are not uniform but there develops a difference in the thermal energy generated for the same energization time with the increase in variations of the resistance value, and therefore compensation is necessary.

Figure 5:
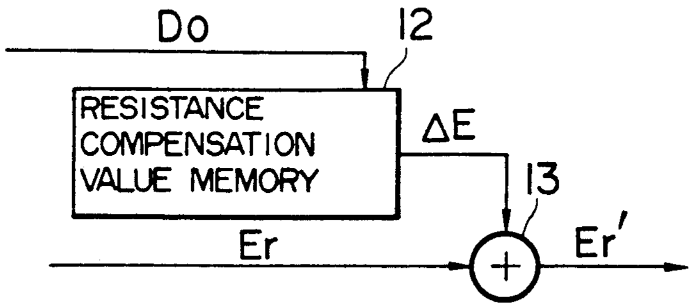
FIG. 5 is a block diagram showing an example of a circuit for resistance compensation.

FIG. 5 is a block diagram showing an example of a circuit for resistance compensation.

A resistance compensation value memory 12 has stored therein a compensation value $\Delta E$ based on a resistance value for each heat-generating element. The compensation value $\Delta E$ which is read out only when the recording data $D_0$ is "1" with respect to an output of the applied energy computation circuit 2 is added to the compensation energy $E_r$ at an adder 13 and applied to the energy control circuit 5. The compensation value $\Delta E$ is a difference between the energization time required for each heat-generating element to generate a target energy and the energization time required for generating the same target energy with an average resistance value, and has a positive or negative value. In similar fashion, the output $E_r'$ of the adder 13 may have a negative value. Since the energy control circuit 5 shown in FIG. 1 determines the final applied energy from both the recording energy $E_p$ and the compensation energy $E_r'$ including the resistance value compensation, however, the applied energy never assumes a negative value.

In FIG. 1, the recording energy $E_p$ produced by the applied energy computation circuit 2, together with the heat storage data $E_s$ of a corresponding heat-generating element, is applied to the heat storage computation circuit 7 sequentially, and the heat storage data $E_s'$ for the particular heat-generating element after a one-line recording cycle is calculated and applied sequentially to the heat storage memory 4. The heat storage memory 4 sequentially updates the stored data by the heat storage data $E_s'$ applied sequentially thereto. The heat storage computation circuit 7 effects the computation of equation (2) below, for instance, and thus determines the heat storage data following a one-line recording cycle.

$$E_s' = K_1 E_s + K_2 E_p \quad (2)$$

where $K_1$ and $K_2$ are factors determined by the one-line recording cycle. In other words, $K_1$ is a reduction rate of the heat storage energy $E_s$, and $K_2$ is the ratio of contribution of the recording energy $E_p$ to the increase in the heat storage energy $E_s$.

A specific configuration of the heat storage computation circuit 7 will be explained with reference to FIGS. 6 and 7.

Figure 6:
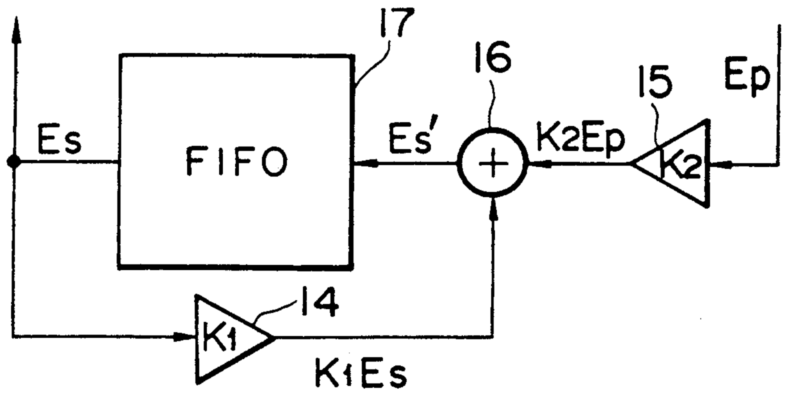
FIG. 6 is a block diagram showing an example of configuration of a heat storage computation circuit.
Figure 7:
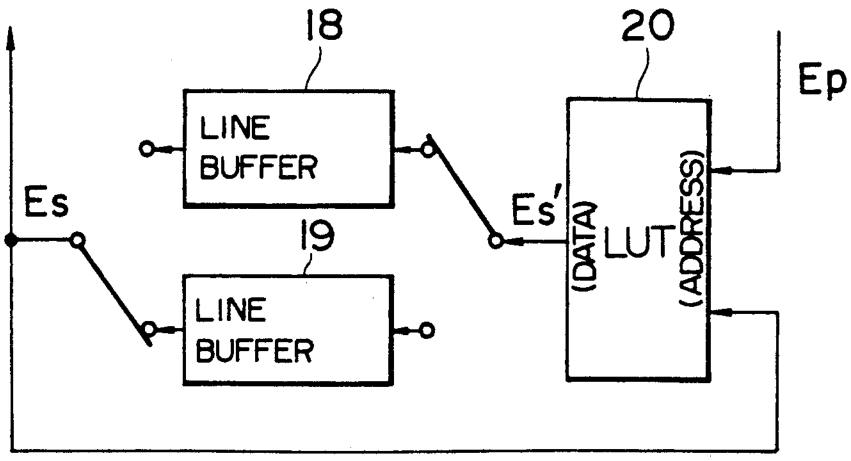
FIG. 7 is a block diagram showing another example of configuration of the heat storage computation circuit.

FIG. 6 is a block diagram showing an example of configuration of the heat storage computation circuit, and FIG. 7 a block diagram showing another example of configuration of the heat storage computation circuit.

As shown in FIG. 6, the heat storage data $E_s$ and the recording energy $E_p$ sequentially applied to the circuit are multiplied by $K_1$ and $K_2$ respectively at multipliers 14 and 15, added at an adder 16, and written in a first-in first-out (FIFO) memory 17.

The FIFO 17 is used for storing the heat storage data $E_s$ because the heat storage data $E_s$ is required to be read and written sequentially at high speed, and the reading and writing processes are desirably independent of each other.

The FIFO 17 may be replaced by the switching operation of two line buffers 18 and 19 as shown in FIG. 7. Also, in the example shown in FIG. 6, the heat storage computation effected by the multipliers 14, 15 and the adder 16 may be replaced by the computation the heat storage computation LUT 20 having stored the result of heat storage computation therein.

In FIG. 1, the energy control circuit 5 determines and controls the energy applied to each heat-generating element on the basis of the recording energy $E_p$ determined by the applied energy computation circuit 2 and the compensation energy $E_r$. As described above, according to the present embodiment, the energy is controlled by changing the energization time.

With the increase in the recording speed, it becomes necessary to effect detailed and fine energy control within a shorter period of time. The energy control will be explained periods, however, only the energy control during the energization period will be explained.

Figure 8:
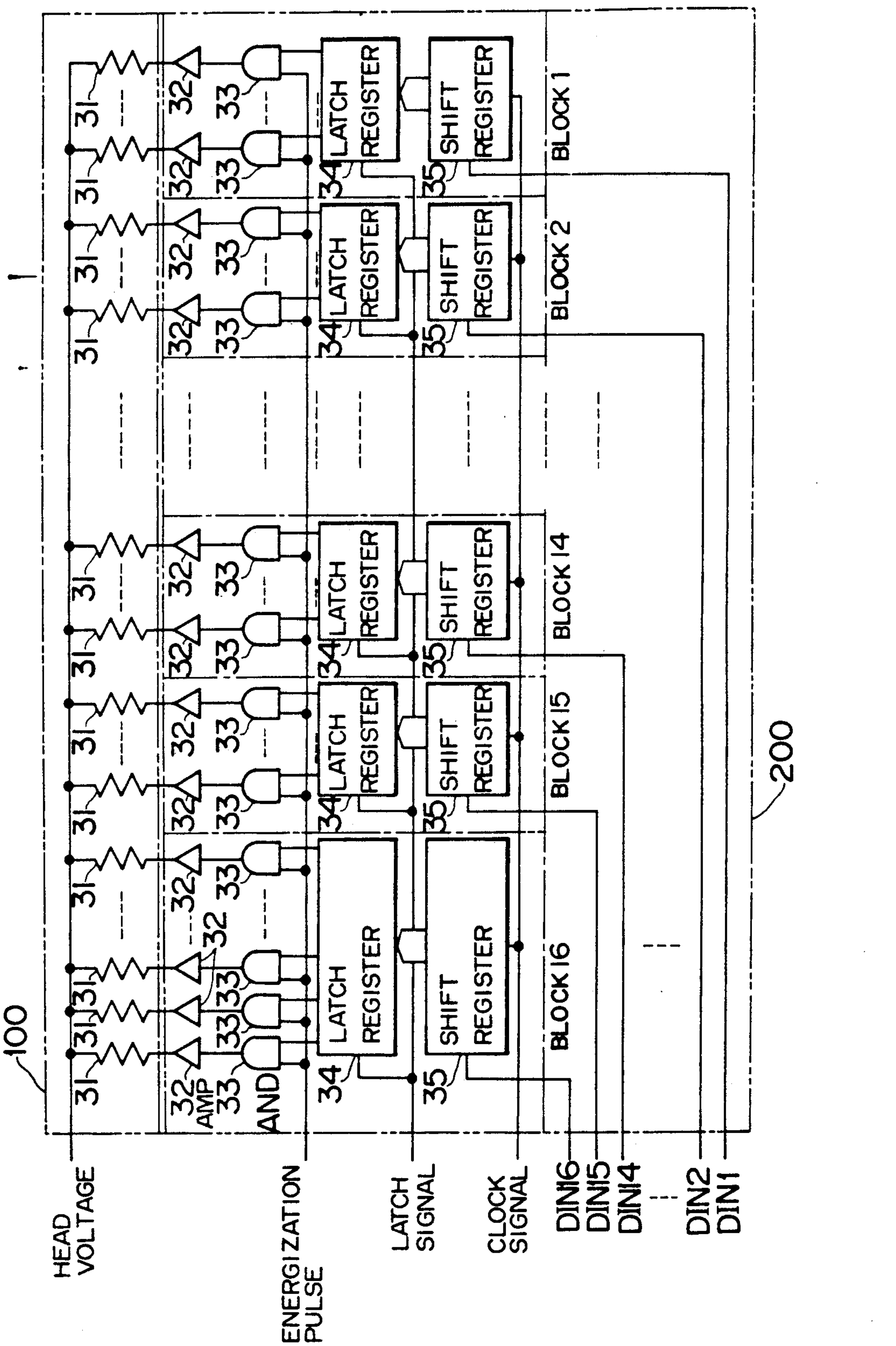
FIG. 8 is a circuit diagram showing an example of configuration of the thermal head.
Figure 9:
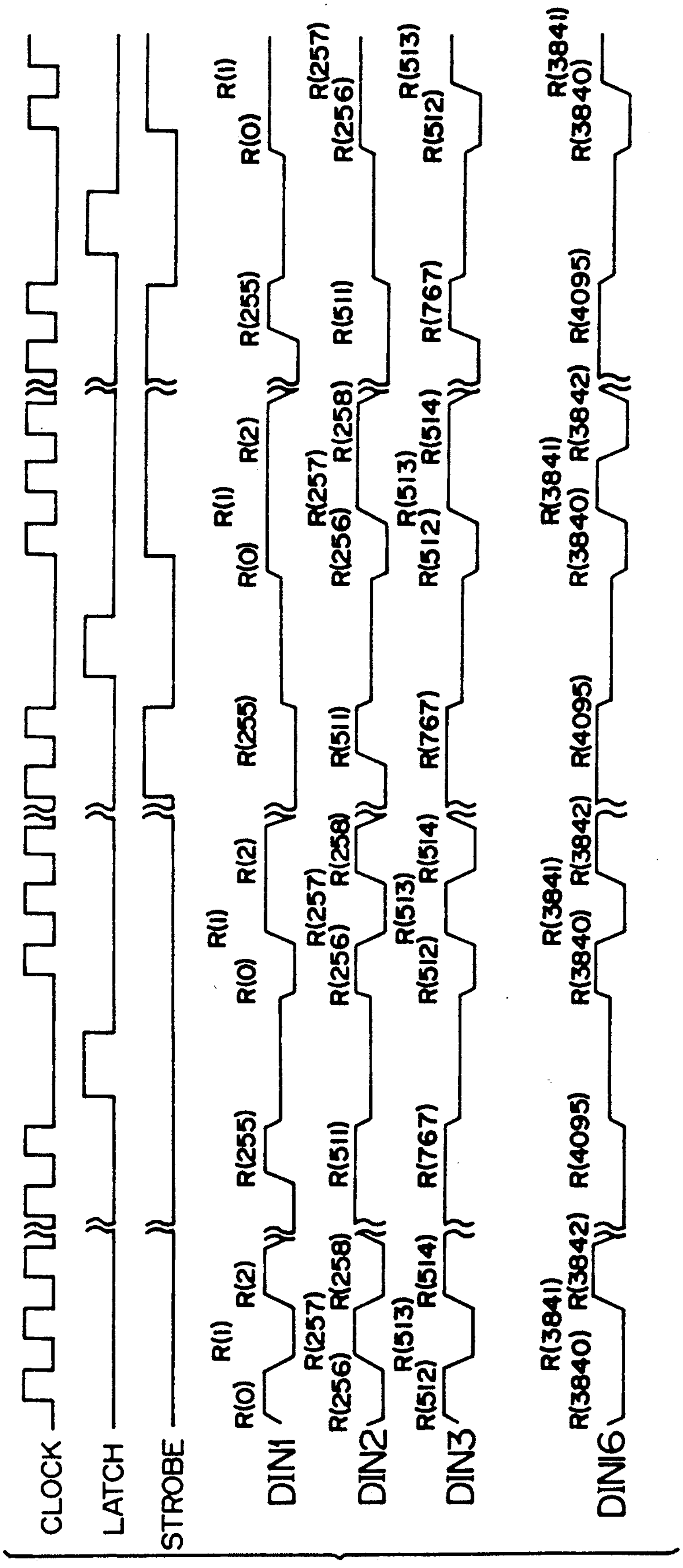
FIG. 9 is a timing chart showing the operation of the thermal head shown in FIG. 8.

FIG. 8 shows an example of a circuit configuration of the thermal head 6, and FIG. 9 shows a timing chart for data transfer. The thermal head 6 includes a heat-generating section 100 and a heat-generating driver 200. The heat-generating section 100 is a collection of heat-generating elements 31. This example shows a case in which there are 4096 units of heat-generating elements 31. The energization driver 200 has the internal portion thereof divided into a plurality of blocks for increasing the data transfer speed, each block being adapted to be supplied with data. In the case shown in FIG. 8, the energization driver 200 is divided into 16 units of blocks 1 to 16, and has data input wires DIN1 and DIN16 for respective blocks. Energization data R(0) for the heat-generating element No. 0 to the energization data R(255) for the heat-generating element No. 255 are applied by way of the DIN1. Similarly, R(256) to R(511) are applied by way of DIN2, and R(3840) to R(4095) by way of DIN16. Since every block has the same operation, only one of them will be explained below.

Each block of the energization driver 200 includes 256 amplifiers 32, 256 AND elements 33, a 256-bit latch register 34, and a 256-bit shift register 35 thereby to control the energization of the 256 heat-generating elements independently of each other. The energization data applied by way of the data input wires sequentially are stored sequentially in the shift registers 35 in synchronism with the data transfer clock applied to the clock wires. Once the shift registers 35 are filled up, all the data in the shift registers are latched at the same time in the latch register 34 in synchronism with the latch pulse applied to the latch wire. The energization data thus latched in the latch register 34 are applied to an AND gate 33 together with an energization pulse applied to the strobe wire, and the resulting output is used to drive the amplifier 32 connected to each heat-generating element 31 thereby to control the energization of the heat-generating element 31. In short, the energization pulse applied to the strobe wire and the energization data latched in the latch register 34 are applied to the heat-generating element 31 for a "1" period at the same time for heat generation.

Figure 10:
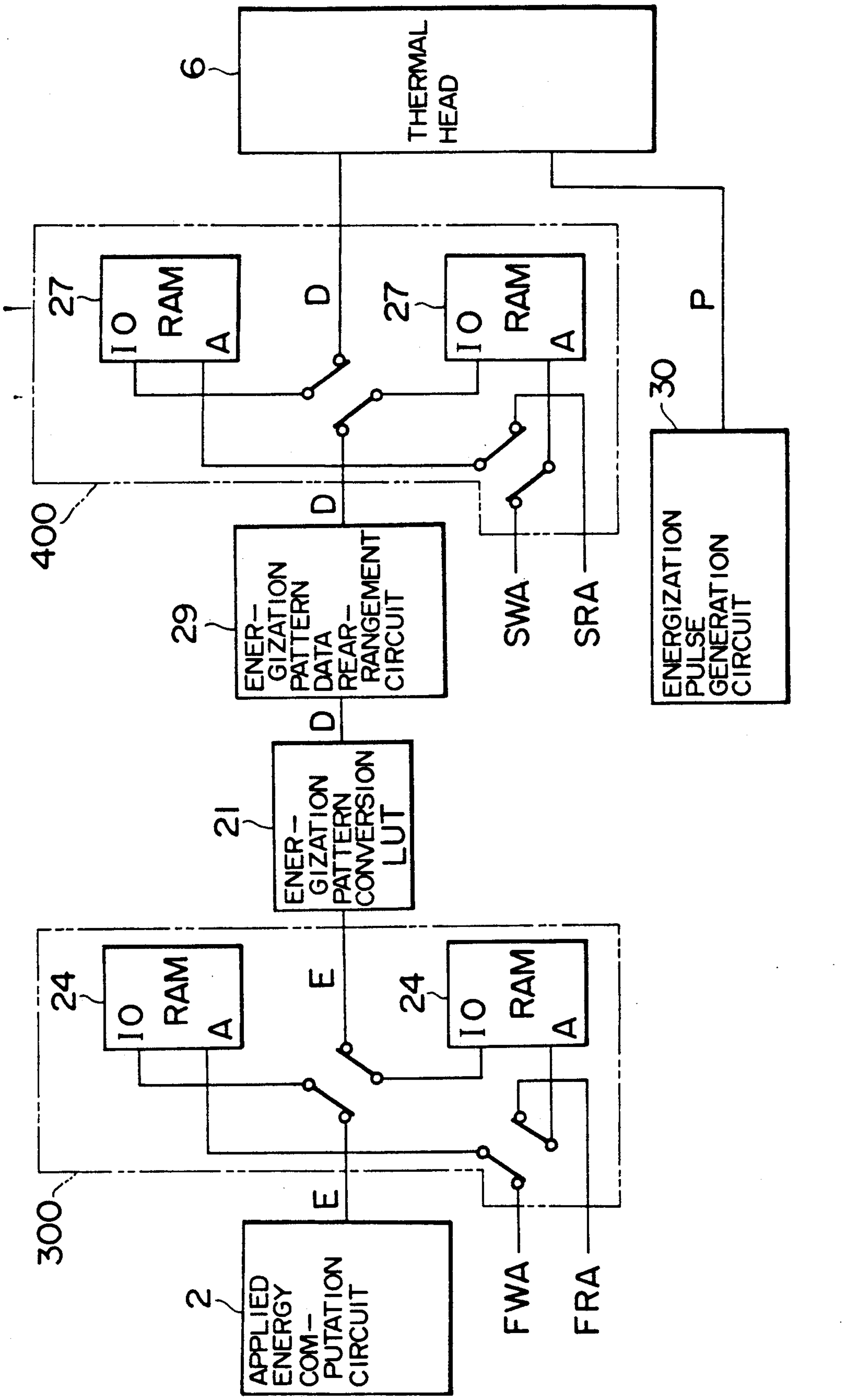
FIG. 10 is a block diagram showing a configuration of an energy control circuit.

FIG. 10 is a block diagram showing an example of configuration of the energy control circuit 5.

The line buffer 300 includes two sets of RAM 24 which are switched for each line, and the applied energy E is stored for one line and produced during the next-line recording cycle. The applied energy E produced from the line buffer 300 is converted into an energization pattern data D by an energization pattern conversion LUT 21, and further rearranged to adapt for transfer to the thermal head 6 by the energization pattern data rearrangement circuit 29. The resulting data is stored in the line buffer 400. The line buffer 400 stores one-line of the energization pattern data D thus rearranged by switching of the two sets of RAM 27, and at the same time produces an energization pattern data stored in the preceding line cycle. This energization data D and the energization pulse P generated at the energization pulse generation circuit are applied to the thermal head 6 thereby to control the energization time width for each heat-generating element of the thermal head 6.

An energization period for a given heat-generating element to record a single dot is divided into a plurality of sections, and each section is weighted differently. For each section thus weighted, "0" or "1" data is transferred to the thermal head 6 energization control section of the heat-generating element, so that the energization is prohibited for the section in which "0" is transferred while the energization is effected during the weighting period in which "1" is transferred, thereby controlling the energization of each heat-generating element. In this way, the section for energization is selected for each heat-generating element, and the sections thus selected are combined to control the energization time. According to this embodiment, each section is applied to a strobe of the thermal head 6. Explanation will be made with reference to a case in which an energization period is divided into eight equal sections. Unless the minimum interval of division is limited by the time required for a unit data transfer to the thermal head 6, there is no limit posed on the number of divisions, which are not required to have equal intervals of division.

In the case where the energization time is controlled with eight divisions, there are a maximum number of controllable levels if the respective sections are weighted as 1, $\frac{1}{2}$, $\frac{1}{4}$, ....., 1/64, 1/128 respectively. A timing chart for data transfer and energization pulses under such a condition is shown in FIG. 11.

Figure 11:
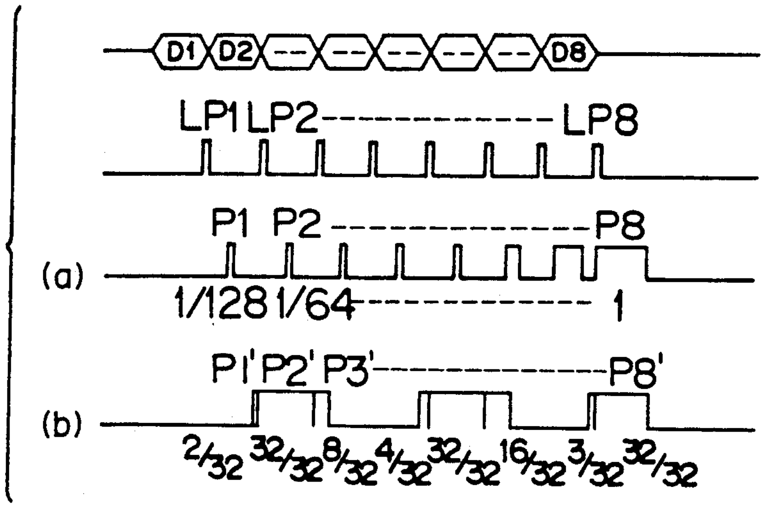
FIG. 11 is a timing chart for energization time control.

Characters P1 to P8 in (a) of FIG. 11 designate energization pulses having relative widths from 1/128 to 1 obtained as the result of weighting.

Reference characters D1 to D8 designate data for recording a dot, and are indicated by "0" or "1" in order to determine whether a particular heat-generating element is to be energized during each equally-divided section. When D1 is 1, therefore, the particular element is energized by a P1 pulse, and if D1 is 0, it is not energized by the P1 pulse. If D1=D3=D5=D7=1 and at the same time D2=D4=D6=D8=0, then the particular element is energized by P1, P3, P5 or P7 pulse. The thermal head includes thereon a shift register and a latch register. The data D1 to D8 supplied sequentially to the shift register for each heat-generating element are transferred also sequentially to the latch register by latch pulses LP1 to LP8 respectively.

Specifically, when each data D1 associated with each heat-generating element is held register in the first stage, the entire data $D_1$ are transferred simultaneously to the latch register by the latch pulse LP1 to effect the energization control of the heat-generating element, and at the next time when the data D2 relating to each heat-generating element is held in the shift register, the data D2 is entirely transferred to the latch register by the latch pulse LP2. A similar process is performed for the subsequent stages of data.

The energization of each heat-generating element is controlled by the data in the latch register, and therefore if an energization pulse Pl is applied by the data D1 during energization, for example, the next data D2 may be supplied to the shift register at the same time.

In an energization using an energization pulse obtained by the above-mentioned weighting procedure, the maximum energization time of a given heat-generating element is attained when all the data Dl to D8 are equal to "1", that is, $1/8\ (1+\frac{1}{2}+\frac{1}{4}+1/8\ .....+1/128) \approx \frac{1}{4}$. The actual energization time is thus at most less than 25% of a predetermined energization period, with the result that the applied voltage would be required to be increased at the sacrifice of the service length of the thermal head. An energization pulse of an extremely short duration, on the other hand, is undesirable as an unstable energization effect would result. Thus the energization pulses P1' to P8' with the following weighting are assumed, for example: 2/32, 3/32, 4/32, 8/32, 16/32, 32/32, 32/32, 32/32.

Further, in order to stabilize the effect of an energization pulse of short duration, the order of the energization pulses P1 to P8 and the positions thereof within divided sections are changed.

Figure 12:
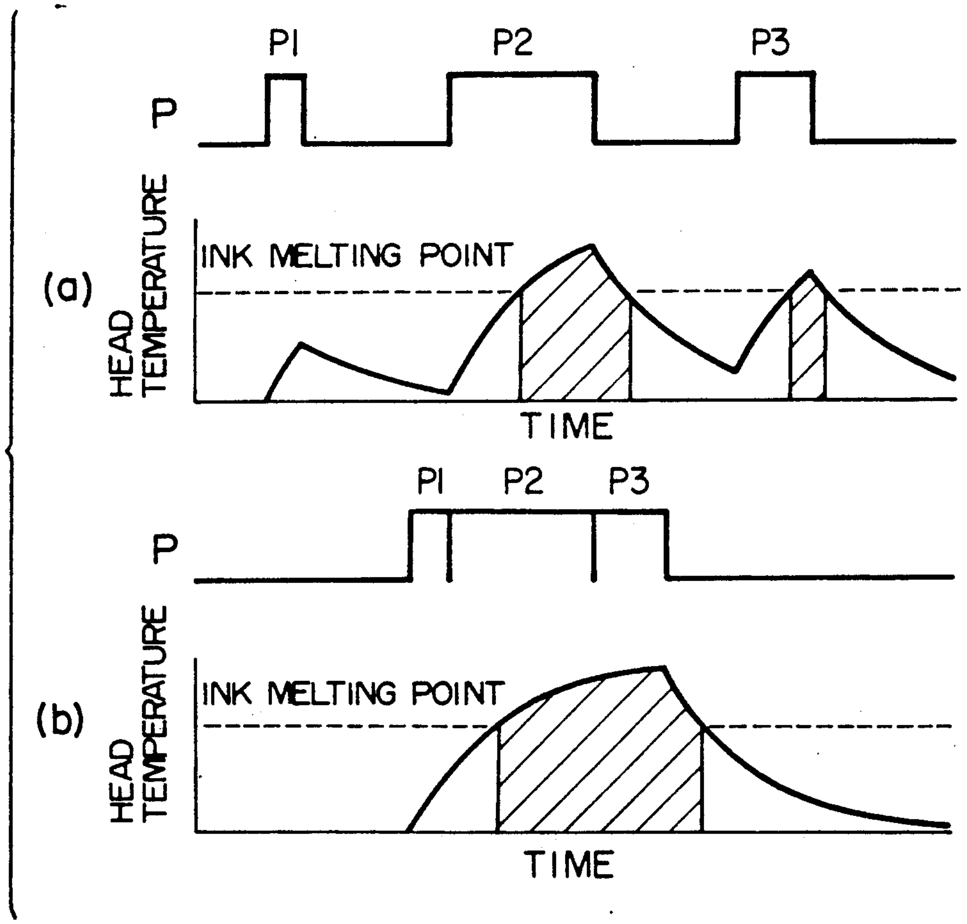
FIG. 12 is a diagram showing the effect of a combination of energization pulses.

As shown in (a) of FIG. 12, in the case where the energization pulses P1, P2 and P3 are separate from each other, the effect of the short pulse P1 in particular is small and unstable. If the energization pulses are adjoining each other as shown in (b) of FIG. 12, however, the effect of the pulse of short duration becomes very stable. An example is shown in (b) of FIG. 11. Pulses of short duration arranged before and after a longer pulse, and all the pulses are arranged adjoining each other to make up a single continuous pulse, thereby securing the stable effect of each energization pulse.

Figure 13:
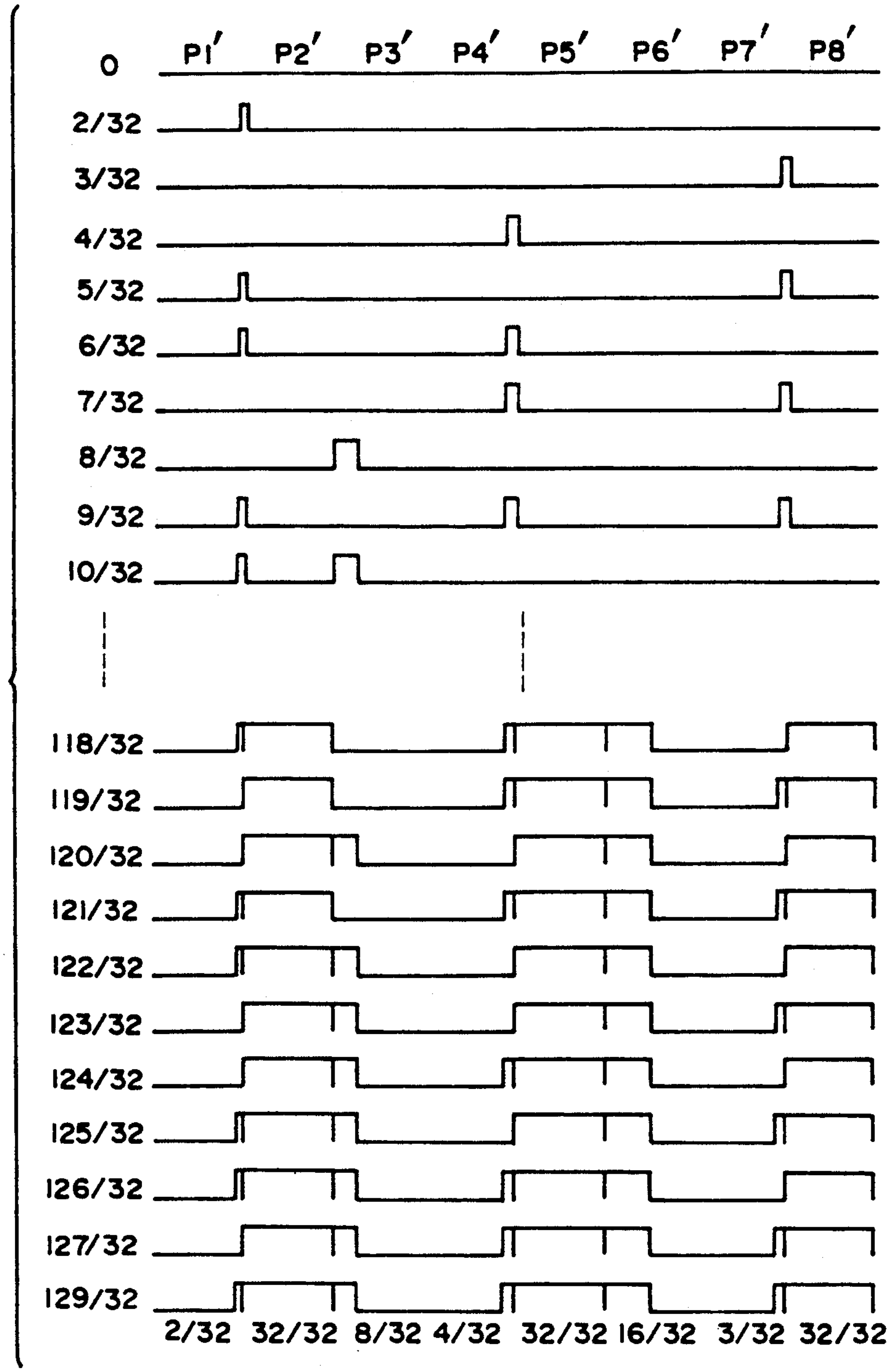
FIG. 13 is a diagram for explaining combinations of energization pulses.

In this case of weighting, the relative pulse width of the energization pulses P1' to P8' is given as 1/8 (2/32+3/32+4/32+8/32+16/32+32/32+32/32+32/32) for the maximum energization time of a given heat-generating element of more than 50% of a predetermined energization period. The energization time is changeable by a combination of the energization pulses P1' to P8' shown in FIG. 13 and controllable in 128 steps of 0 to 129/32 (except for 1/32 and 128/32).

In controlling the energization time in the manner mentioned above, it is necessary to convert the energy E applied to each heat-generating element into a corresponding energization pattern data D (a combination of data for divided sections D1 to D8 for selecting energization pulses corresponding to E). This conversion is effected by an energization pattern conversion look-up table (LUT) which stores an energization pattern data for the applied energy E as shown in FIGS. 14 to 16.

Figure 14:
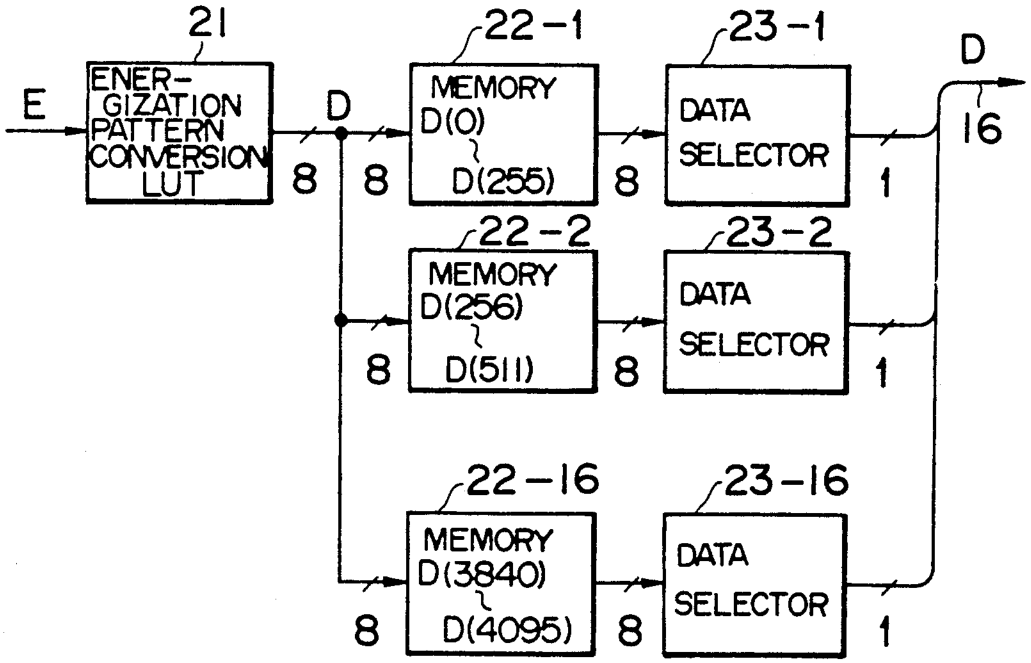
FIG. 14 is a block diagram showing an example of an energization pattern data rearrangement circuit.
Figure 15:
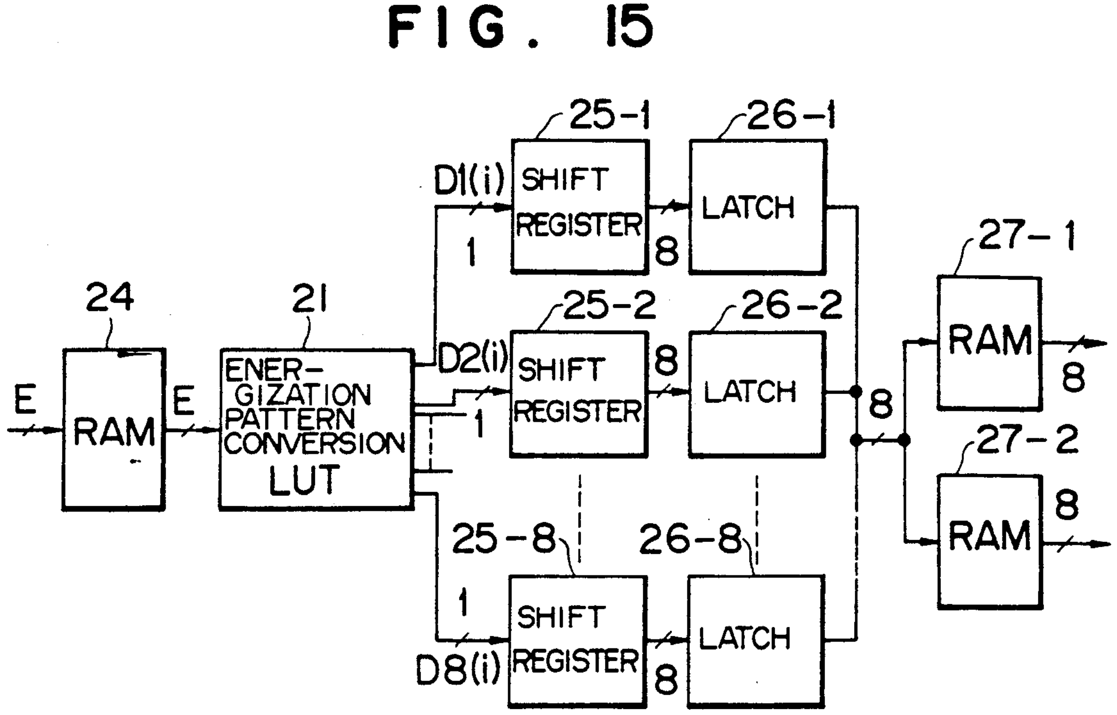
FIG. 15 is a block diagram showing another example of the energization pattern data rearrangement circuit.
Figure 16:
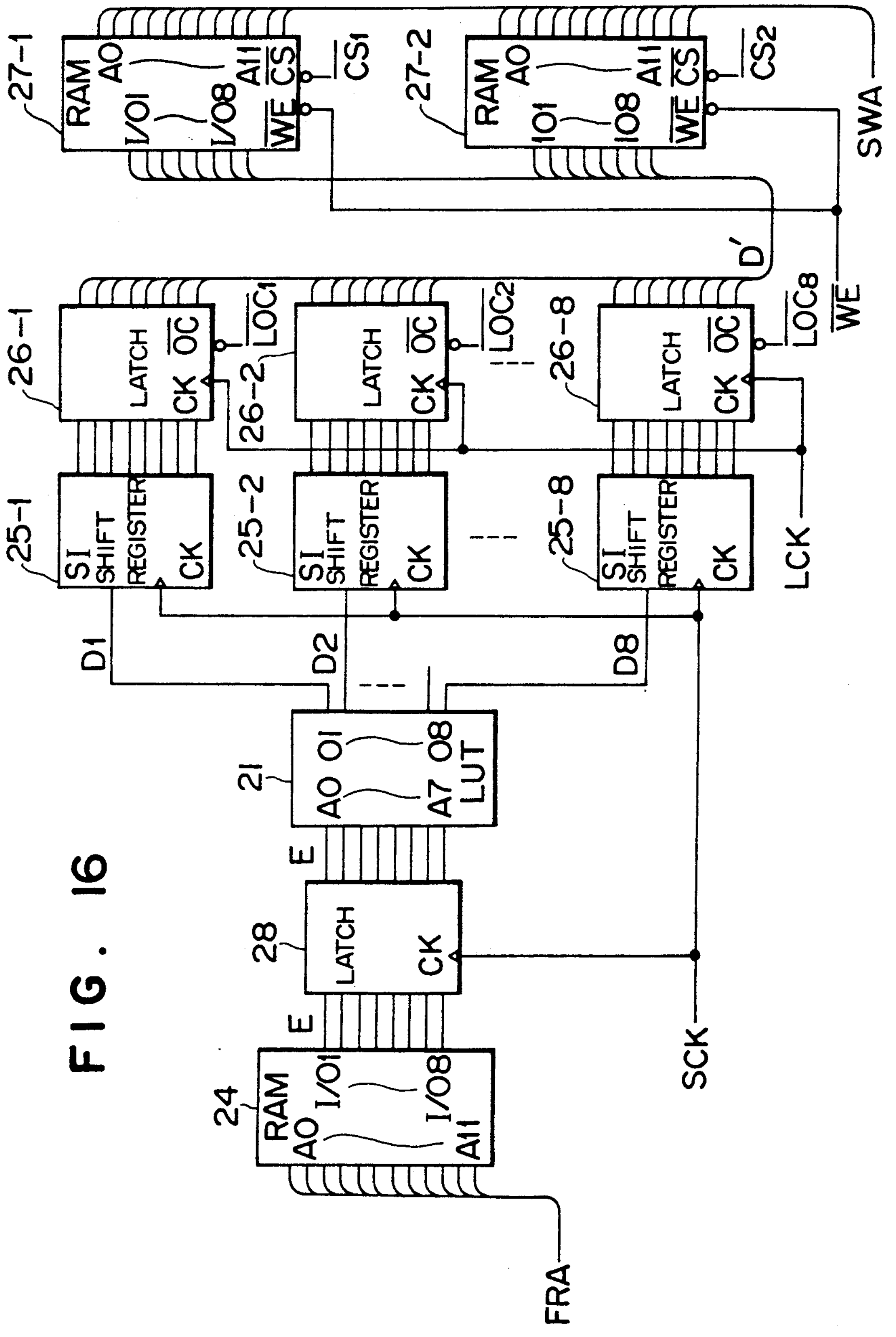
FIG. 16 is a detailed circuit diagram showing still another example of the energization pattern data rearrangement circuit.

The energization pattern data conversion (rearrangement) circuits shown in FIGS. 14 and 15 are configured within the energy control circuit of FIG. 1.

As explained above, the width of the minimum divided section is not shorter than the time required for the first data transfer to the thermal head 6, and therefore it is necessary to shorten the data transfer time if a detailed energy control is to be effected with many divisions. A method of shortening the data transfer time is by dividing the shift register on the thermal head into a plurality of blocks and providing each block with a data input line thereby to assure simultaneous transfer of a plurality of data. If a shift register is divided into a number n of blocks with a number n of data input lines, for example, the data transfer time is shortened by a factor of n.

In view of the fact that the applied energy E is transferred sequentially to the heat-generating elements, however, the energization pattern data D (D1 to D8) produced from the energization pattern conversion LUT are also transferred to the heat-generating elements in a sequential manner. If data are to be transferred to the addresses of the heat-generating elements in parallel by blocks, it is necessary to rearrange the energization pattern data D.

FIG. 14 shows an example of an energization pattern data rearrangement circuit.

Explanation will be made with reference to the case of FIG. 14 in which the thermal head 6 has 4096 heat-generating elements aligned and divided into 16 blocks each having 256 elements.

Assume that the 4096 heat-generating elements are affixed with numbers (addresses) of 0 to 4095. The applied energy E(i) sent to each element sequentially is converted into energization pattern data D(i) (i: 0 to 4095) by the energization pattern conversion LUT 21, which is sequentially stored in 16 memory units 22-1 to 22-16 by blocks. Character D(0), for instance, designates the energization pattern data of the heat-generating element No. 0. During the next-line recording cycle, the data stored in the memory units 22-1 to 22-16 are read and transferred to the thermal head for recording. The memory units 22-1 to 22-16 are thus configured as two line buffers which are switched for each line to perform the write and read operations (while one line buffer is used for writing, the other reads). The energization pattern data D(0+j), D(256+j), ....., D(3840+j) (J: 0 to 255) are read sequentially from the memory units 22-1 to 22-16. Each pattern data read from each memory unit consists of eight bits D1 to D8. First, the data D1 associated with the energization pulse P1 for the first divided section is selected at the same time by the data selectors 23-1 to 23-16 for transfer to the thermal head, and then the data D2 is selected and transferred to the thermal head. In similar fashion, a bit of data corresponding to Dl to D8 is read eight times from the memory units 22-1 to 22-16. Also, the energization pattern data Dl to D8 read simultaneously by the data selectors 23-1 to 23-16 are selected and transferred simultaneously to the thermal head.

The aforementioned embodiment requires a multiplicity of memory units and a the like, and poses the problems of high cost and bulky circuit.

FIG. 15 shows an example of rearrangement of energization pattern data using a simple circuit having shift registers and random access memories (RAM).

In the case of FIG. 15, the applied energy E(i) representing one line is stored provisionally in the RAM 24, a first random access memory having an address i (i: 0 to 4095) corresponding to the number of heat-generating elements. This data is read and rearranged in the next-line recording cycle. The applied energy E(i) read out of the RAM 24 is converted into an energization pattern data D(i) at the energization pattern conversion LUT 21, so that the bit data D1(i) to D8(i) corresponding to the energization pulse of each divided section are applied to the shift registers 25-1 to 25-8 respectively. D1(i) to D8(i) represent the energization pattern data Dl to D8 associated with the i-th heat-generating element.

The outputs of shift registers 25-1 to 25-8, which are of the serial-input parallel-output type, are latched in the latches 26-1 to 26-8 each time eight data are stored, and are sequentially stored in the RAM 27-1 or 27-2 associated with the second random access memory.

Data transfer to the thermal head and recording are effected in the next-line recording cycle. As a result, the RAM 24 and the RAMs 27-1 and 27-2 representing two lines each are switched to perform write and read operations separately for each line.

Figure 17:
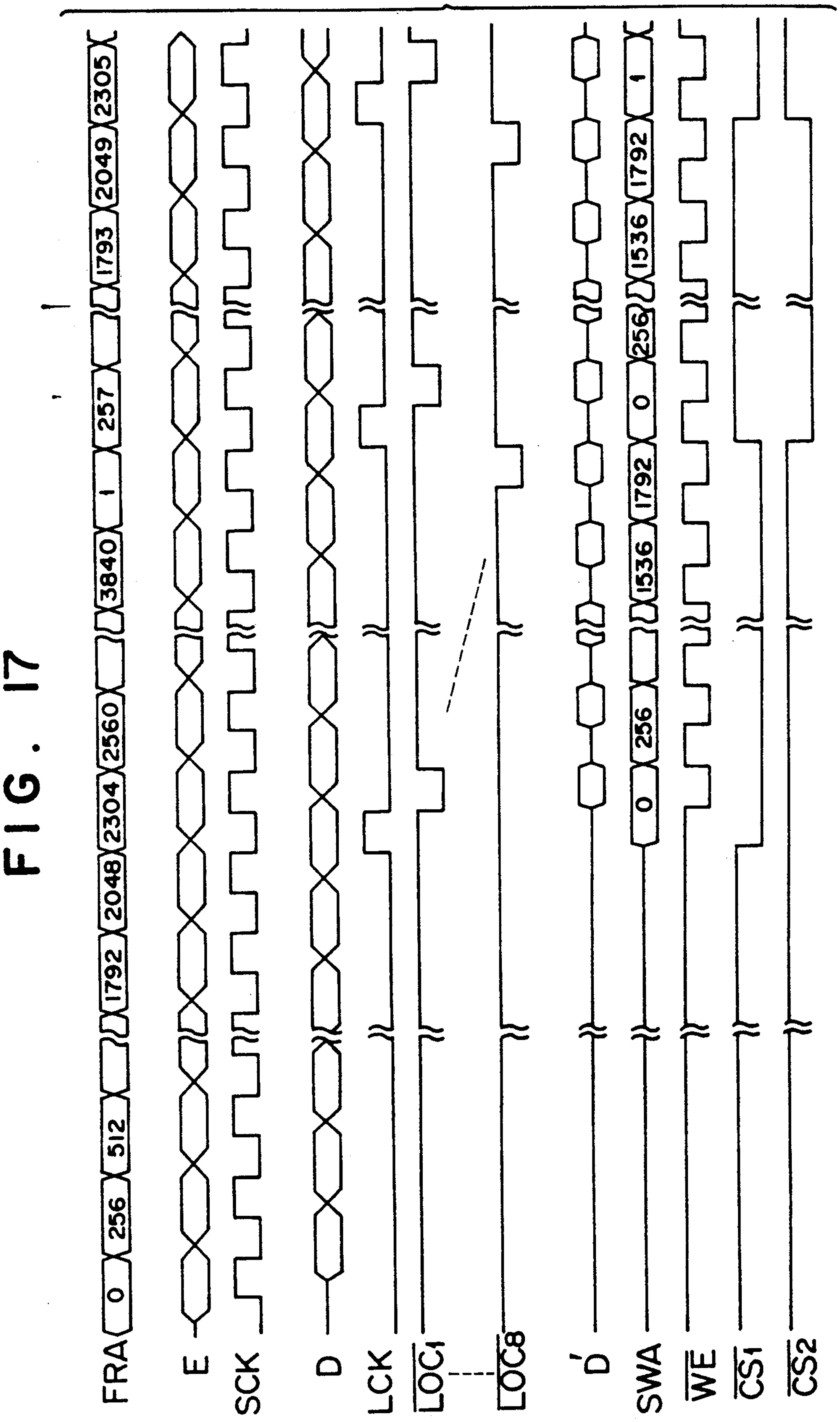
FIG. 17 is a timing chart showing the operation of the energization pattern data rearrangement circuit of FIG. 16.

FIG. 16 shows a detailed configuration of the circuit of FIG. 15, and FIG. 17 shows a timing chart, with reference to which the operation of the circuit will be explained in more detail.

The applied energy E(i) read from the RAM 24 for the i-th heat-generating element is latched at a latch 28 and is converted into energization pattern data Dk(i) (k: 1 to 8) by energization pattern conversion LUT 21 at an appropriate timing. The data Dk(i) thus converted, which are given in a combination of bit data D1 to D8 associated with the energization pulses P1 to P8 respectively as mentioned above, are applied in parallel fashion to the shift registers 25-1 to 25-8 respectively. These processes of operation are accomplished in synchronism with a basic clock SCK (FIG. 17). The address FRA for reading the data E(i) from the RAM 24 is changed in the manner mentioned below (E(i) in FIG. 17).

0, 256, 512, 768, 1024, . . . , 3840,
1, 257, 513, 769, 1025, . . . , 3841,
.
.
.
255, 511, 767, 1023, . . . , 4095

Thus the following data Di(0) to Di(4095) are applied sequentially to the shift register 25-1:

D1(0), D1(256), D1(512), . . . , D1(3840),
D1(1), D1(257), D1(513), . . . , D1(3841)
. . .
. . .
. . .
D1(255), D1(511), D1(767), . . . , D1(4095)

where D1(0), for example, is an energization pattern data corresponding to the energization pulse P1 for the heat-generating element No. 0. The shift registers 25-2 to 25-8 are also supplied with the data D2(i) to D8(i) in similar sequence in parallel to the data Dl(i) (Dk(i), k=1 to 8 in FIG. 17). The outputs of the shift registers 25-1 to 25-8 are simultaneously latched in the latches 26-1 to 26-8 by the clock LCK each time eight data (such as i=0, 256, 512, ..., 1792) are stored. The latches 26-1 to 26-8, equipped with an $\overline{OC}$ (output control), are adapted to produce latched data only during the period when $\overline{OC}$ remains "0". The data latched in the latches 26-1 to 26-8 are produced sequentially in accordance with the signals LOC1 to LOC8 and applied first to the RAM 27-1 sequentially. When the latch 26-1 latches D1(0), D1(256), D1(512) to D1(1792), for example, the latch 26-2 latches D2(0), D2(256), D2(512), ....., D2(1792). In similar fashion, the latch 26-3 latches D3(0), so on, and the latch 26-8 the data D8(0), D8(256), ....., D8(1792). Further, the data D1(0) to D1(1792) of the latch 26-1 are produced by $\overline{LOC1}$ and applied to the RAM 27-1. Next, the data D2(0) to D2(1792) of the latch 26-2 are produced by $\overline{LOC2}$ and applied to the RAM 27-1. In similar fashion, the data of each latch is produced by $\overline{LOC3}$ to $\overline{LOC8}$. In response to the switching of the chip select signal and $\overline{CS1}$ and $\overline{CS2}$ and the write enable signal $\overline{WE}$, the RAM 27-1 and RAM 27-2 perform the write operation alternately thereby to store all the data half and half and thus the next eight data (such as i=2048, 2304, ..., 3840) are latched with respect to the RAM 27-2 and read out. The chip select signals $\overline{CS1}$ and $\overline{CS2}$ are adapted to be switched alternately. As a result, the data shown in Table 2 below are read out sequentially from the latches 26-1 to 26-8 for the RAM 27-1.

TABLE 2

| Bit 1 | Bit 2 | Bit 3 | . . . | Bit 8 |
|---|---|---|---|---|
| D1(0) | D1(256) | D1(512) | . . . | D1(1792) |
| D2(0) | D2(256) | D2(512) | . . . | D2(1792) |
| . | . | . | | . |
| D8(0) | D8(256) | D8(512) | . . . | D8(1792) |
| D1(1) | D1(257) | D1(513) | . . . | D1(1793) |
| . | . | . | | . |

In similar manner, the data shown in the table below are sequentially read out of the latches 26-1 to 26-8 for the RAM 27-2.

TABLE 3

| Bit 1 | Bit 2 | Bit 3 | . . . | Bit 8 |
|---|---|---|---|---|
| D1(2048) | D1(2304) | D1(2560) | . . . | D1(3840) |
| . | . | . | | . |
| D8(2048) | D8(2304) | D8(2560) | . . . | D8(3840) |
| D1(2049) | D1(2305) | D1(2561) | . . . | D1(3841) |
| . | . | . | | . |

On the other hand, the addresses SWA of the RAMs 27-1 and 27-2 into which these data are written are changed in the manner mentioned below.

| |
|---|
| 0, 256, 512, 768, . . . , 1792, |
| 1, 257, 513, 769, . . . , 1793, |
| . |
| 255, 511, 767, 1023, . . . , 2047 |

Specifically, the data D1(0) to D1(1792) produced by the signal $\overline{LOC1}$ are written at the address 0 of the RAM 27-1, the data D2(0) to D2(1792) produced by the signal $\overline{LOC2}$ are written at the address 256 of RAM 27-1, and so on until the data D8(0) to D8(1792) produced by the signal $\overline{LOC8}$ are written at the address 1792 of the RAM 27-1 and similar manner subsequently. In the process, RAM 27-1 and RAM 27-2 store data completely rearranged as shown in Tables 4 and 5 below.

TABLE 4

| Address | Bit 1 | uz,1/32 RAM 27-1<br>Bit 2 | Bit 3 | . . . | Bit 8 |
|---|---|---|---|---|---|
| 0 | D1(1) | D1(257) | D1(512) | . . . | D1(1792) |
| 1 | D1(0) | D1(256) | D1(513) | . . . | D1(1793) |
| . | . | . | . | | . |
| 255 | D1(255) | D1(511) | D1(767) | . . . | D1(2047) |
| 256 | D2(0) | D2(256) | D2(512) | . . . | D2(1792) |
| 257 | D2(1) | D2(257) | D2(513) | . . . | D2(1793) |
| . | . | . | . | | . |
| 1792 | D8(0) | D8(256) | D8(512) | . . . | D8(1792) |
| . | . | . | . | | . |
| 2047 | D8(255) | D8(511) | D8(767) | . . . | D8(2047) |

TABLE 5

| Address | RAM 27-2<br>Bit 1 | Bit 2 | Bit 3 | . . . | Bit 8 |
|---|---|---|---|---|---|
| 0 | D1(2048) | D1(2304) | D1(2560) | . . . | D1(3840) |
| 1 | D1(2049) | D1(2305) | D1(2561) | . . . | D1(3841) |
| . | . | . | . | | . |
| 255 | D1(2303) | D1(2559) | D1(2815) | . . . | D1(4095) |
| 256 | D2(2048) | D2(2304) | D2(2560) | . . . | D2(3840) |
| 257 | D2(2049) | D2(2305) | D2(2561) | . . . | D2(3841) |
| . | . | . | . | | . |
| 1792 | D8(2048) | D8(2304) | D8(2560) | . . . | D8(3840) |
| . | . | . | . | | . |
| 2047 | D8(2303) | D8(2559) | D8(2815) | . . . | D8(4095) |

Figure 18:
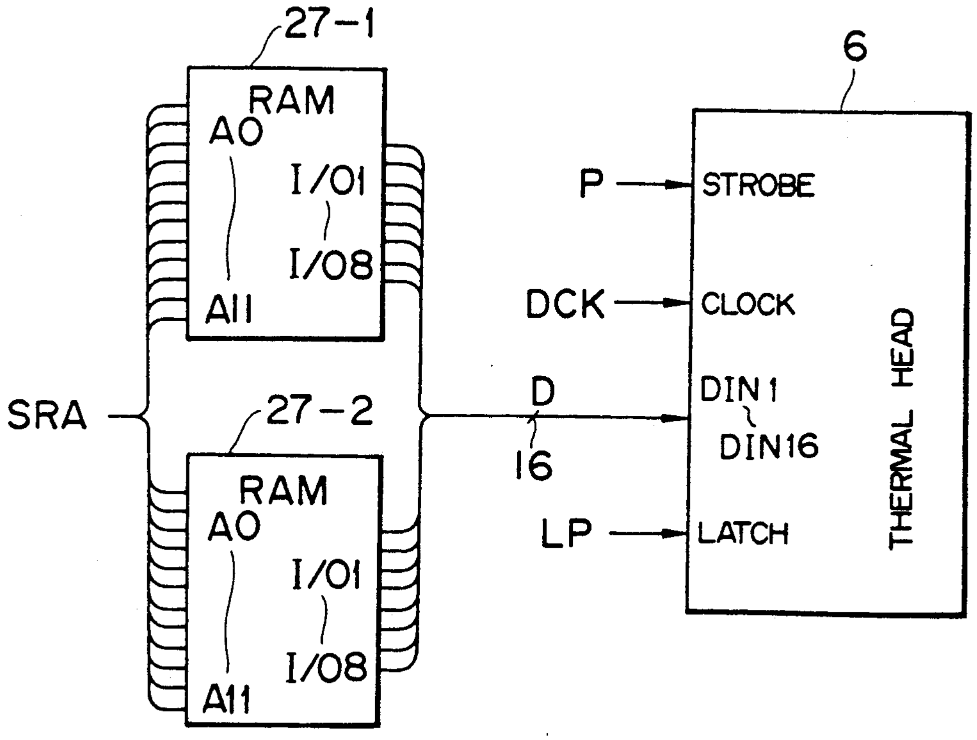
FIG. 18 is a block diagram showing the data transfer to the thermal head.
Figure 19:
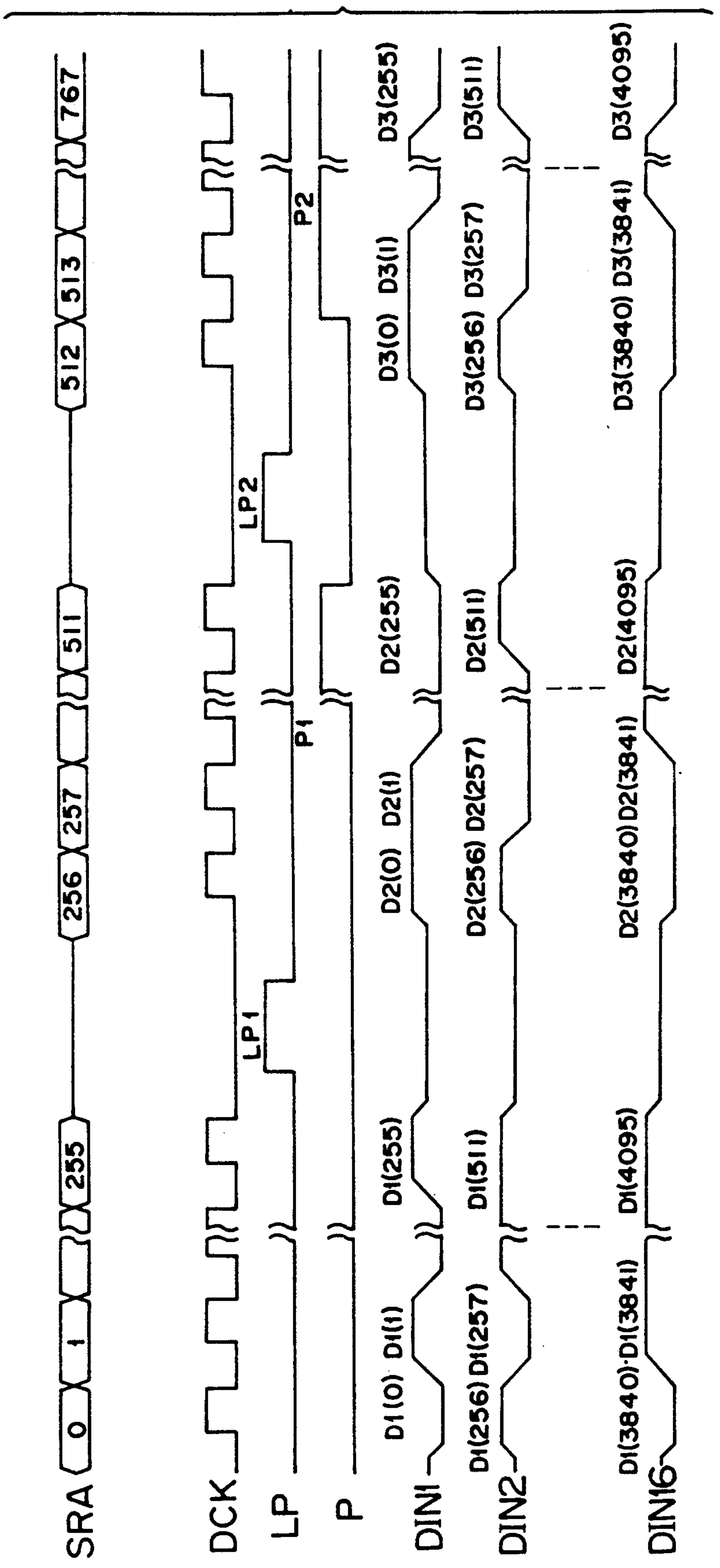
FIG. 19 is a timing chart showing the operation of data transfer of FIG. 16.

After that, as shown in FIG. 18, the data stored in RAM 27-1 and RAM 27-2 are simply read out simultaneously from the bits 1 to 8 ($I/O_1$ ti $I/O_8$) of each RAM respectively and are transferred in parallel fashion to each heat-generating element of each block of the thermal head in accordance with the sequence of the address i. A related timing chart is shown in FIG. 19. More specifically, the 256 heat-generating elements of the first block are impressed with D1(0) to D1(255) sequentially, the 256 heat-generating elements of the second block are supplied in parallel with D1(256) to D1(511) in sequential manner, and in similar manner for subsequent blocks until the 16th block is impressed with data D1(3840) to D1(4095). Upon completion of application of signal D1 to the 4096 heat-generating elements for a line this way, signals D2 to D8 are similarly applied to each heat-generating element of each block sequentially by similar operation.

Instead of changing the read address FRA of RAM 24 and the write address SWA of RAM 27-1 and RAM 27-2 in the aforementioned case of rearrangement, it is also possible to change the write address FWA of RAM 24 or the read address SRA of RAM 27-1 and RAM 27-2.

Further, although the thermal head has 4096 heat-generating elements and is divided into 16 blocks in the above-described embodiment, the invention is also easily applicable to a thermal head having various different numbers of heat-generating elements and divided into different numbers of blocks by changing the number of latches or the order of the addresses.

Furthermore, in place of weighting the divided sections of the energization period by changing the energization time as in the aforementioned embodiment, the same function is achieved with equal effect by changing the applied voltage for the divided sections or by a combination of the described method and a change in the applied voltage.

According to the present embodiment, finely detailed energy control is simplified by a simple circuit and heat storage computations.

It will thus be understood from the foregoing description that according to the present invention there is provided a thermal head driving apparatus in which an accurate heat storage compensation effect is obtained with a simple circuit and a high-quality recording image is thus produced at low cost even at the time of high-speed, high-definition recording operation.

We claim:

1. A thermal head driving apparatus for controllably applying energy to each of a plurality of heat-generating elements making up a thermal head in accordance with input recording data, the apparatus comprising:

a buffer memory for storing the input recording data;

temperature detection means for detecting a substrate temperature of the thermal head;

a heat storage memory for storing heat storage data representing an amount of heat storage for each of said heat-generating elements for a recording cycle;

applied energy computation means for computing a recording energy for each heat-generating element on the basis of recording data outputted from said buffer memory, temperature data outputted from said temperature detection means, and heat storage data outputted from said heat storage memory, and for computing a compensation energy on the basis of recording data outputted from said buffer memory and said temperature data;

heat storage computation means for computing heat storage data for each heat-generating element for a next recording cycle on the basis of the heat storage data outputted from said heat storage memory and the recording energy computed by said applied energy computation means, and for sequentially updating the heat storage data stored in said heat storage memory by applying the computed heat storage data to said heat storage memory for storage therein; and energy control means for controllably applying energy to each of said heat-generating elements in response to the recording energy and the compensation energy computed by said applied energy computation means.

2. A thermal head driving apparatus according to claim 1, wherein said energy control means controllably applies energy to each heat-generating element by dividing an energization cycle of said heat-generating elements into a plurality of periods, defining an amount of energy to be applied to said heat-generating elements during each of the plurality of periods, with mutually different amounts of energy being defined for at least two of the periods, and applying energy to each heat-generating element during a combination of periods selected form the plurality of periods in accordance with the recording energy and the compensation energy computed by the applied energy computation means.

3. A thermal head driving apparatus according to claim 1, wherein the heat-generating elements of the thermal head are divided into a plurality of blocks of heat-generating elements, with respective recording data input lines being provided for the plurality of blocks, and wherein the energy control means includes a first random access memory for storing a line of continuous input recording data, a plurality of serial-input parallel-output shift registers for storing recording data sequentially outputted from said first random access memory, a second random access memory for sequentially storing recording data outputted from said shift registers, and means for controlling read and write addresses of the first and second random access memories to rearrange the line of continuous input recording data stored in the first random access memory into a form suitable for transfer to the plurality of blocks of heat-generating elements via the respective data input lines.

4. A thermal head driving apparatus for controllably applying energy to each of a plurality of heat-generating elements of a thermal head in accordance with input recording data, said apparatus comprising:

means for dividing an energization cycle of said heat-generating elements into a plurality of periods;

means for defining an amount of energy to be applied to said heat-generating elements during each of the plurality of periods, with mutually different amounts of energy being defined for at least two of the periods; and means for applying energy to each of the heat-generating elements during a combination of periods selected from the plurality of periods in accordance with the input recording data.

5. A thermal head driving apparatus for controllably applying energy to each of a plurality of heat-generating elements aligned on a thermal head in accordance with input recording data, said apparatus comprising:

a first random access memory for storing a line of continuous input recording data;

a plurality of serial-input parallel-output shift registers for storing recording data sequentially outputted from said first random access memory;

a second random access memory for sequentially storing recording data outputted from said shift registers;

data input means for dividing said heat-generating elements into a plurality of blocks of heat-generating elements, and for inputting recording data to said plurality of blocks; and means for controlling read and write addresses of said first and second random access memories to optimumly rearrange the line of continuous input recording data stored in said first random access memory for transfer to said data input means.

6. A thermal head driving apparatus for controllably applying energy to each of a plurality of heat-generating elements making up a thermal head in accordance with input recording data, said apparatus comprising:

a buffer memory for storing the input recording data;

temperature detection means for detecting a substrate temperature of the thermal head;

a heat storage memory for storing heat storage data representing an amount of heat storage for each heat-generating element for a recording cycle;

an applied energy computation circuit for computing a recording energy and a compensation energy for each heat-generating element on the basis of recording data outputted from said buffer memory, temperature data outputted from said temperature detection means, and heat storage data outputted from said heat storage memory, based on an assumption that said each heat-generating element and heat-generating elements adjacent thereto are all to be energized during the recording cycle, said applied energy computation circuit computing energy in accordance with a predetermined function of the substrate temperature of said thermal head selected on the basis of which ones of said each heat-generating element and said adjacent heat-generating elements are actually to be energized during the recording cycle, the compensation energy compensating for an energy shortage which occurs when at least one of said adjacent heat-generating elements is not actually to be energized during the recording cycle;

a heat storage computation circuit for computing heat storage data for each heat-generating element for a next recording cycle on the basis of the heat storage data outputted from said heat storage memory and the recording energy computed by said applied energy computation circuit, and for sequentially updating the heat storage data stored in said heat storage memory by applying the computed heat storage data to said heat storage memory for storage therein; and an energy control circuit for controllably applying energy to each of said heat-generating elements in accordance with the recording energy and the compensation energy computed by said applied energy computation circuit.

* * * * *